(12) United States Patent
Glossop et al.

(10) Patent No.: US 10,402,176 B2
(45) Date of Patent: Sep. 3, 2019

(54) METHODS AND APPARATUS TO COMPILE CODE TO GENERATE DATA FLOW CODE

(71) Applicant: Intel Corporation, Santa Clara, CA (US)

(72) Inventors: Kent Glossop, Merrimack, NH (US);
Kermin Fleming, Hudson, MA (US);
Yongzhi Zhang, Wayland, MA (US);
Simon Steely, Jr., Hudson, NH (US);
Jim Sukha, Marlborough, MA (US);
Uma Srinivasan, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/855,964

(22) Filed: Dec. 27, 2017

(65) Prior Publication Data
US 2019/0042217 A1   Feb. 7, 2019

(51) Int. Cl.
*G06F 9/44* (2018.01)
*G06F 8/41* (2018.01)

(52) U.S. Cl.
CPC .............. *G06F 8/433* (2013.01); *G06F 8/447* (2013.01); *G06F 8/4441* (2013.01)

(58) Field of Classification Search
CPC ..... G06F 8/447; G06F 8/4452; G06F 11/3466
See application file for complete search history.

(56) References Cited

U.S. PATENT DOCUMENTS

| | | | |
|---|---|---|---|
| 2003/0233643 A1* | 12/2003 | Thompson | G06F 8/4452 717/161 |
| 2006/0041872 A1* | 2/2006 | Poznanovic | G06F 8/447 717/140 |
| 2015/0007182 A1* | 1/2015 | Rossbach | G06F 9/4843 718/102 |
| 2015/0317134 A1* | 11/2015 | Kim | G06F 8/40 717/146 |

OTHER PUBLICATIONS

Govindaraju et al.,"DySER: Unifying Functionality and Parallelism Specialization for Energy-Efficient Computing," Published by the IEEE Computer Society, Sep./Oct. 2012, 14 pages.

(Continued)

*Primary Examiner* — Chat C Do
*Assistant Examiner* — Lenin Paulino
(74) *Attorney, Agent, or Firm* — Hanley, Flight & Zimmerman, LLC

(57) ABSTRACT

Methods, apparatus, systems and articles of manufacture to compiler compile code to generate dataflow code are described. An example compiler apparatus includes an intermediate representation transformer to transform input software code to intermediate representation code; an instruction selector to insert machine instructions of a target execution platform in the intermediate representation code to generate machine intermediate representation code; and a target machine transformer to: convert a portion of the machine intermediate representation code to dataflow code to generate dataflow intermediate representation code; and allocate registers within the dataflow intermediate representation code.

15 Claims, 5 Drawing Sheets

(56) References Cited

OTHER PUBLICATIONS

Smith et al., "Compiling for EDGE Architectures," Appears in the Proceedings of the 4th International Symposium on Code Generation and Optimization, 2006, 11 pages.
The LLVM Compiler Infrastructure, retrieved from, http://www.llvm.org/, on May 1, 2018, Maintained by the llvm-admin team, 4 pages.
Pellauer et al., "Efficient Control and Communication Paradigms for Coarse-Grained Spatial Architectures," ACM Transactions on Computer Systems, vol. 33, No. 3, Article 10, Publication date: Sep. 2015, 32 pages.
Canis et al., "LegUp: An open-source high-level synthesis tool for FPGA-Based Processor/Accelerator Systems," ACM Transactions on Embedded Computing Systems, vol. 1, No. 1, Article 1, Publication date: Jul. 2012, 25 pages.

\* cited by examiner

METHODS AND APPARATUS TO COMPILE CODE TO GENERATE DATA FLOW CODE

FIELD OF THE DISCLOSURE

This disclosure relates generally to compilers and, more particularly, to methods and apparatus to compile code to generate data flow code.

BACKGROUND

Many computing systems operate according to a control flow architecture. In a control flow architecture, the execution of instructions of a program is driven by a program counter that steps through the instructions of a program. In other words, the order of execution of the instructions of the program is defined by the structure of the program itself. In some cases, a control flow architecture may operate improperly when attempting to implement parallel processing. For example, a program may state that an instruction is to be executed even though an input (e.g., operand) of the instruction has not yet been updated by a parallel operating instruction.

Some computing systems utilize a data flow architecture. A data flow architecture is not driven by an order of instruction execution defined by a program. Instead, a data flow architecture executions instruction according to the availability of the inputs (e.g., operands) of the instruction. For example, if an instruction has three operands, a computing system utilizing a data flow architecture will execute the instruction as soon as the three operands are provided to the instruction by other instruction(s) on which the instruction depends. Accordingly, a data flow architecture can perform in a highly parallel environment without concern that instructions will execute before their data dependencies are updated/satisfied. For example, a data flow architecture may be utilized in large scale computing systems that use massive numbers of processing elements to highly parallelize processing.

BRIEF DESCRIPTION OF THE DRAWINGS

In general, the same reference numbers will be used throughout the drawing(s) and accompanying written description to refer to the same or like parts.

DETAILED DESCRIPTION

A Spatial Accelerator is a programmable accelerator that uses a hybrid of data flow and control flow models with spatial computing concepts to provide a highly parallel, high performance, energy efficient computational fabric usable for a variety of computational needs. Such an accelerator is able to provide performance for existing and new high-performance computing (HPC) programs with the help of highly optimized code generated by a compiler. Methods and apparatus disclosed herein generate such optimized code from input code. For example, the input code may be code developed in a high-level computing language. The input code may not have been optimized for execution on high-performance computing platform. In some examples, a code optimization module may be added to an existing compiler framework to facilitate generation of optimized code by the existing compiler. The example module converts control flow code to optimized data flow for efficient execution using, for example, a spatial accelerator.

Figure 1:
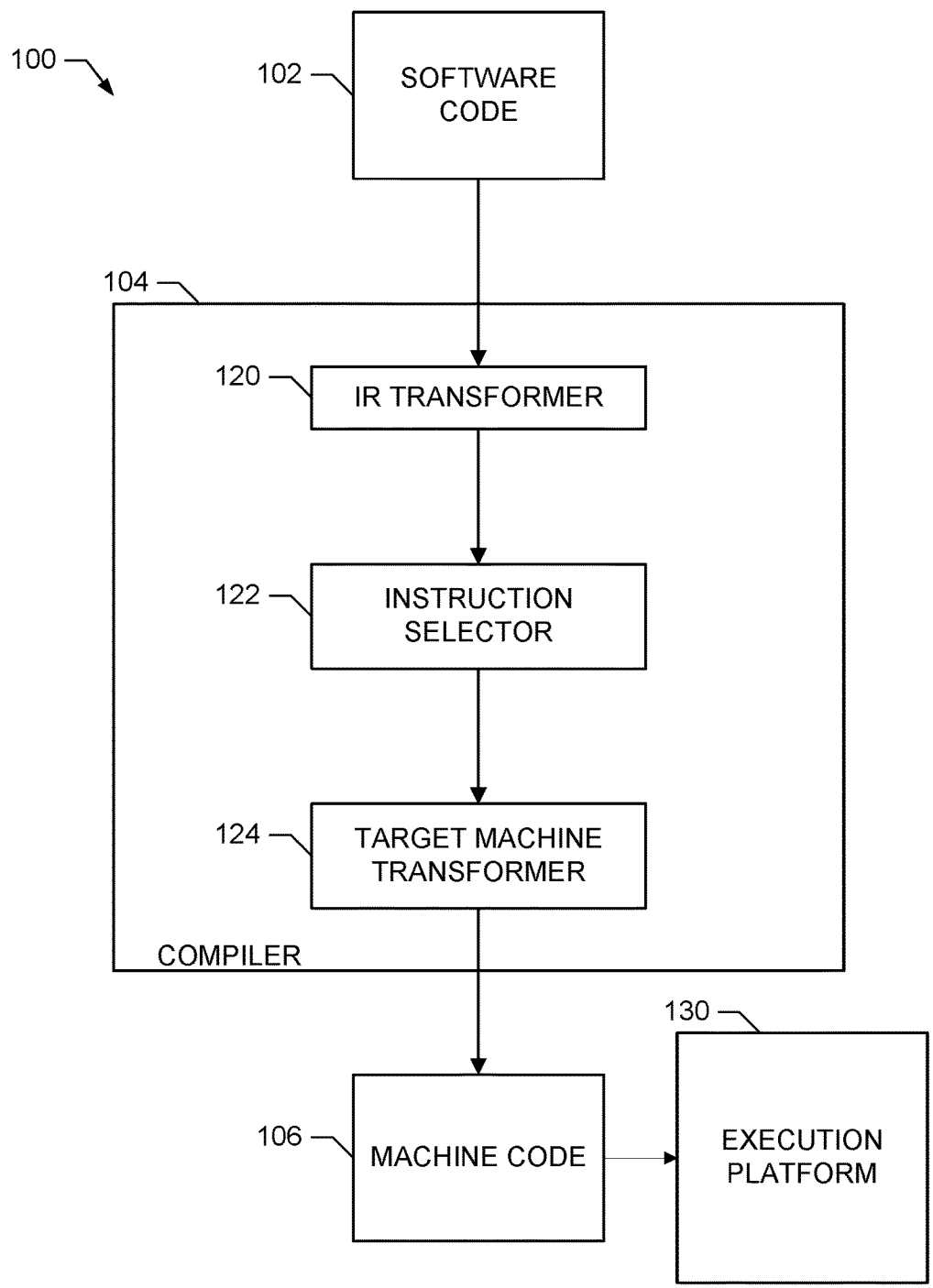
FIG. 1 is a block diagram of an example system in which an example software code is compiled by an example compiler to generate example machine code.

FIG. 1 is a block diagram of an example system 100 in which an example software code 102 is compiled by an example compiler 104 to generate example machine code 106.

The software code 102 of the illustrated example is high level software instructions. For example, the software code 102 may be written in C, C++, FORTRAN, etc. The software code 102 may implement any type of software program that a user desires to execute on an execution platform. In some cases, the software program may be written with a particular execution platform in mind (e.g., may be optimized for use with the execution platform). In other implementations, the software code 102 may have been written without knowledge of the execution platform and/or without intentionally optimizing the software program for the execution platform. For example, the example machine code 106 may be executed with a spatial accelerator even though the software code 102 has not been optimized to operate on a spatial accelerator (e.g., has not been written with data flow execution in mind).

The example compiler 104 includes an example intermediate representation (IR) transformer 120, an example instruction selector 122, and an example target machine transformer 124. The compiler 104 of the illustrated example is a conventional compiler in which the target machine transformer 124 has been modified/supplemented to include conversion of control flow code to data flow code for execution in an environment that supports data flow execution (e.g., a spatial accelerator). For example, the conventional compiler may be an LLVM compiler. Alternatively, the compiler 104 may be implemented from scratch with built in control flow to data flow conversion.

The IR transformer 120 of the illustrated example transforms the example software code 102 into IR code. According to the illustrated example, the IR transformer 120 is a compiler front end. For example, the IR transformer 120 may be a front end of the LLVM compiler. In some examples, the IR transformer 120 may perform multiple IR transformations. For example, the IR transformer 120 may transform the software code 102 to a high-level IR and transform the high-level IR to a mid-level IR.

The example instruction selector 122 transforms the IR received from the example IR transformer 120 into low-level IR where each operation corresponds to an instruction available on the target execution platform/machine. For example, the low-level IR may be assembly code that references temporary registers. The instruction selector 122 may use any technique for instruction selection such as, for example, macro expansion, interpretive code generation, lowest common denominator strategy, etc.

The example target machine transformer 124 of the illustrated example performs optimizations of the low-level IR from the example instruction selector 122 to adapt the instructions for execution on an example execution platform. Such optimizations may reduce/minimize the time needed for execution, reduce/minimize the power needed for execution, minimize the amount of memory utilized during execution, etc. The example target machine transformers 124 converts control flow code to data flow code for execution on an execution platform that is optimized for use with data flow code. In addition, the example target machine transformer 124 optimizes the dataflow code and allocates registers for the variables identified in the low-level code. Implementations of the target machine transfer 124 may perform additional optimizes such as loop optimizations, static single assignment (SSA) optimizations, code generator optimizations, functional language optimizations, etc.

Figure 2:
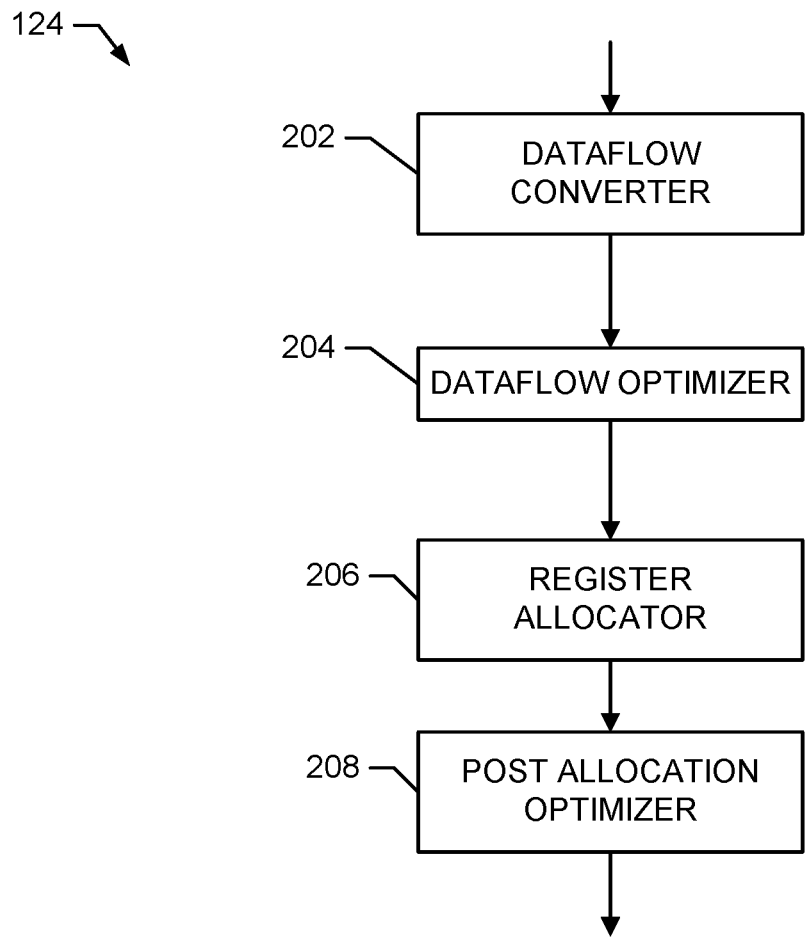
FIG. 2 is a block diagram of an example implementation of the target machine transformer of FIG. 1.

An example implementation of the target machine transformer 124 is described in conjunction with FIG. 2.

The example machine code 106 is optimized machine code for execution on a designated execution platform (e.g., for execution with a spatial accelerator). According to the illustrated example, the machine code 106 is machine instructions that are directly supported by an instruction set architecture (ISA) of the execution platform and have been optimized to use data flow code for efficient execution on the execution platform. Alternatively, any other type of machine specific code may be generated by the example compiler 104.

The example system 100 includes an example execution platform 130 on which the machine code 106 is executed. According to the illustrated example, the execution platform 130 utilizes a spatial accelerator to employ hybrid dataflow and control flow models with spatial computing to provide highly parallel, high performance, energy efficiency computing. Alternatively, any other type of execution platform 130 may be utilized.

In operation, the example compiler 104 compiles the example software code 102 to generate the machine code 106. In some instances, the compiler 104 compiles the code prior to initiating execution of the software code 102 (e.g., ahead of time compilation). In other instances, the compiler 104 may compile after execution has been initiated (e.g., performing just-in-time compiling).

FIG. 2 is a block diagram of an example implementation of the target machine transformer 124 of FIG. 1. The example target machine transfer 124 of FIG. 2 includes an example dataflow converter 202, an example dataflow optimizer 204, an example register allocator 206, and an example post allocation optimizer 208.

The example dataflow converter 202 receives mid-level IR from the example instructor 122 and converts some or all of the control flow code represented in the IR to dataflow code during the compilation of the software code 102. An example process for converting control flow code to data flow code is described in conjunction with blocks 402-416 of FIG. 4. According to the illustrated example, the dataflow converter 202 processes the low-level code in regions to move operations from sequential units to dataflow units and remove branches.

The dataflow optimizer 204 of the illustrated example performs optimizations of the dataflow code output by the example dataflow converter 202 to optimize the code for execution on a dataflow execution platform (e.g., a spatial accelerator). The dataflow optimizations may be any type of known dataflow optimization such as, for example, removal of common subexpressions, replacing expressions that consist of constants with their final value (e.g., 3+5 is replaced with 8), eliminating induction variables, alias classification and pointer analysis, removing assignments to variables that are never used, etc.

The example register allocator 206 processes the low-level IR to assign program variables to registers in the execution platform (e.g., to assign program variables to registers of processing elements of an example spatial accelerator). In some examples, the register allocator 206 assigns large number of variables of the low-level IR to a small number of registers by analyzing the low-level IR to determine which variables will need to be used at the same time and ensuring that overlapping variables are not assigned to the same register.

The example post allocation optimizer performs additional final optimizations after the allocation of registers.

While an example manner of implementing the target machine transformer 124 of FIG. 1 is illustrated in FIG. 2, one or more of the elements, processes and/or devices illustrated in FIG. 2 may be combined, divided, re-arranged, omitted, eliminated and/or implemented in any other way. Further, the example dataflow converter 202, the example dataflow optimizer 204, the example register allocator 206, the example post allocation optimizer 208 and/or, the example IR transformer 120, the example instruction selector 122, the example target machine transformer 124, and/or, more generally, the example compiler 104 may be implemented by hardware, software, firmware and/or any combination of hardware, software and/or firmware. Thus, for example, any of the example dataflow converter 202, the example dataflow optimizer 204, the example register allocator 206, the example post allocation optimizer 208 and/or, the example IR transformer 120, the example instruction selector 122, the example target machine transformer 124, and/or, more generally, the example compiler 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dataflow converter 202, the example dataflow optimizer 204, the example register allocator 206, the example post allocation optimizer 208 and/or, the example IR transformer 120, the example instruction selector 122, the example target machine transformer 124, and/or, more generally, the example compiler 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example target machine transformer 124 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
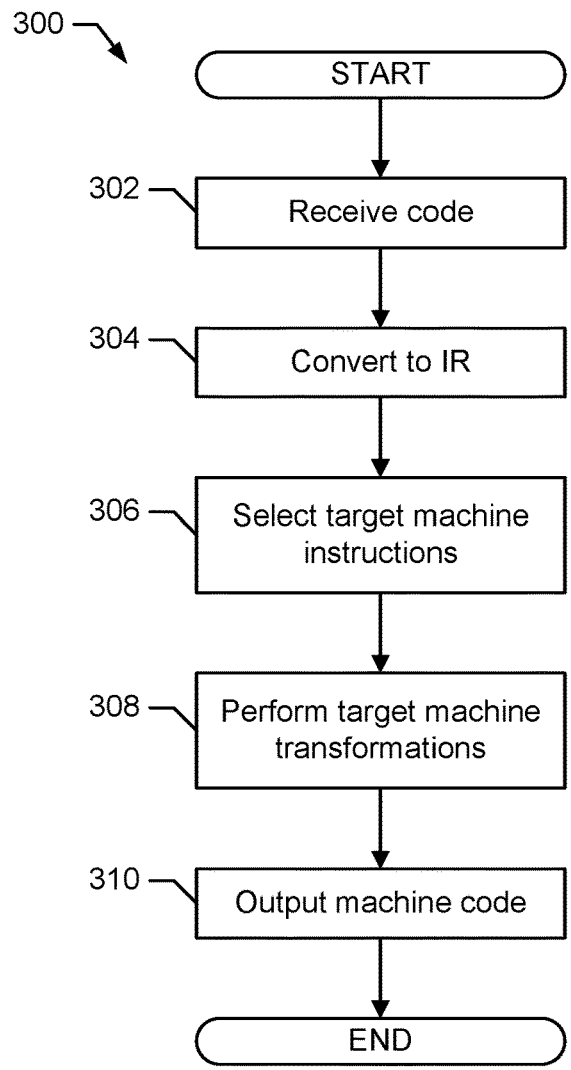
FIGS. 3-4 are flowcharts representative of example hardware logic or machine readable instructions for implementing the compiler and/or, more specifically, the example target machine transformer of FIG. 1 and/or FIG. 2.
Figure 4:
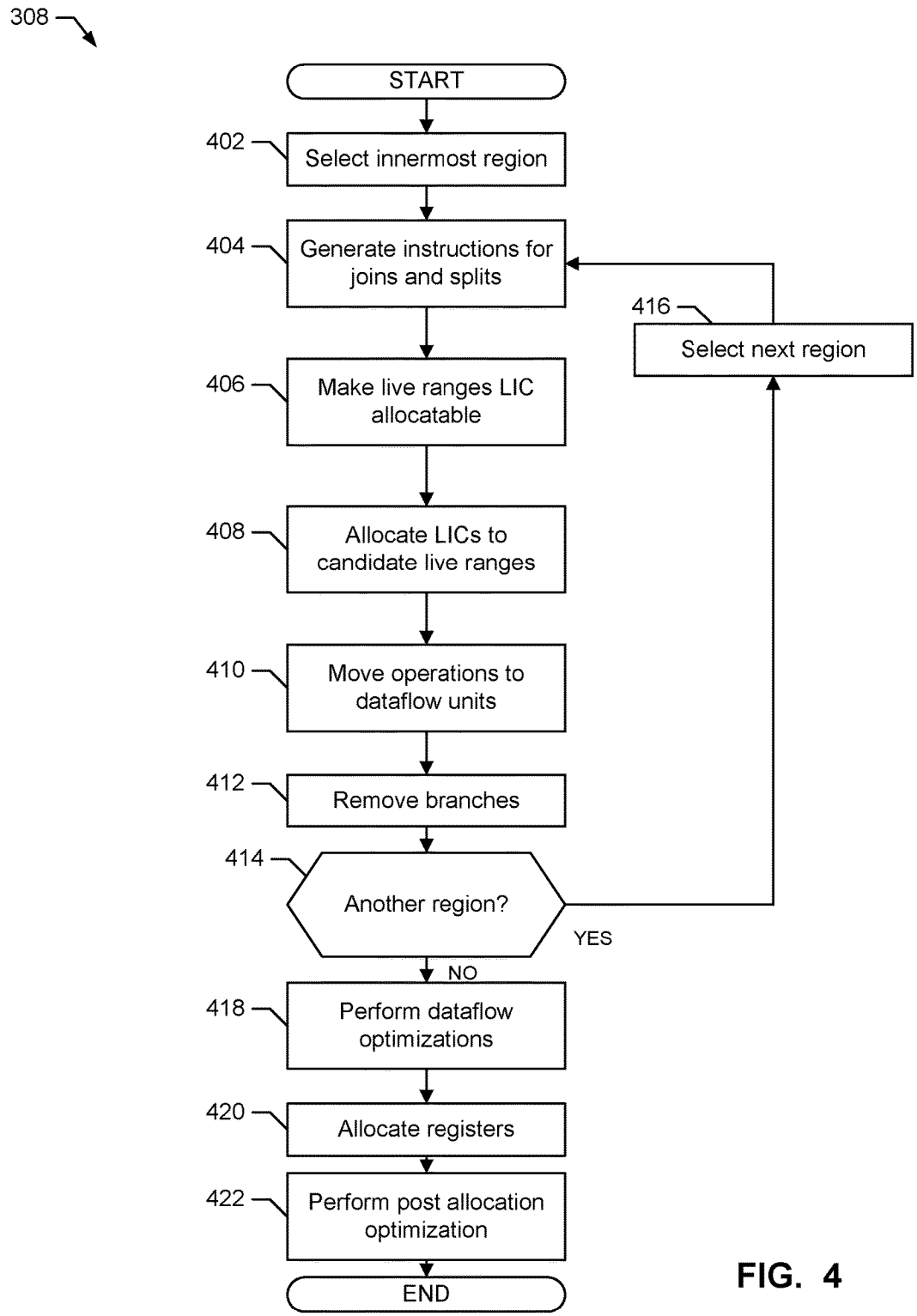

Flowcharts representative of example hardware logic or machine readable instructions for implementing the compiler 104 and/or, more specifically, the example target machine transformer 124 are shown in FIGS. 3-4. The machine readable instructions may be a program or portion of a program for execution by a processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3-4, many other methods of implementing the example compiler 102f may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example program 300 of FIG. 3 begins when the example IR transformer 120 of the example compiler 104 receives the example software code 102 (block 302). The example IR transformer 120 converts the software code 102 (e.g., high-level software code) to IR code (e.g., mid-level IR code) (block 304). The example instruction selector 122 selects target machine instructions to convert the mid-level IR to low-level machine-specific IR (block 306).

The example target machine transformer 124 performs target machine transformations (block 308). According to the illustrated example, the target machine transformations include converting sequential low-level IR to dataflow code. An example implementation of block 308 is described in conjunction with FIG. 4.

After performing target machine transformations (block 308), the example target machine transformer 124 outputs the example machine code 106 (block 310). For example, the machine code 106 may be output for later execution, may be output as part of just-in-time execution, etc.

FIG. 4 is a flowchart illustrating example instructions that may be executed to implement block 308 of FIG. 3. The example process begins when the example dataflow converter 202 selects an inner most region of the low-level code (block 402). For example, the dataflow converter 202 of the illustrated example processes a first region prior to a second region when the first region is contained within the first region.

The example dataflow converter 202 generates dataflow instructions for joins and splits (block 404). According to the illustrated example, joins and splits are implemented using PICK and SWITCH statements.

A PICK instruction picks a value out of two registers based on a predicate. PICK has the following format: % r=PICK % r0, % r1, % r2, where % r is the notation of a virtual register in LLVM. Such an instruction can be written in C programming language as % r=(% r0) ? (% r2): (% r1);

A SWITCH instruction sends an operand to one of two identified registers based on a predicate. SWITCH has the following format: % r1, % r2=SWITCH % r0, % r3, where it sends the value in % r3 to either % r1 or % r2 based on the predicate in % r0. In C it is like: if (% r0) % r2=% r3 else % r1=% r3.

Alternatively, in other examples, other instructions from an ISA of an execution platform may be utilized to implement the joins and splits in the low-level IR.

The example dataflow converter 202 then makes live ranges in the low-level IR allocable to latency insensitive channels (LICs) (block 406) and allocates candidate live ranges to the LICs (block 408). For example, in block 406 and block 408, the example dataflow converter 202 performs a live range analysis to identify when the variables in the low-level IR are active (e.g., when they are active and when they are last used). The live range analysis may be performed after the low-level IR is divided into basic blocks (e.g., code sequence with no branches in except to the entry and no branches out except at the exit). Once the live ranges are identified, LICs of the execution platform (e.g., the spatial accelerator) are assigned to the live ranges. Unlike control flow code that uses a clock signal to control sequencing, the LICs transfer data between processing elements in the execution platform based on the readiness of a sending element to send data and/or the readiness of a receiving element to receive the data.

The example dataflow converter 202 then moves operations that have updated with LICs to the dataflow units of the execution platform (block 410). According to the illustrated example, the operations are moved while preserving the order of memory references.

The example dataflow converter 202 then removes branches from the analyzed region (block 412). The example dataflow converter 202 determines if there are additional regions to be processed (block 414). For example, the example dataflow converter 202 processes the inner-most regions first moving to the outer-most regions. When there are additional regions to be processed, the dataflow converter 202 selects the next region (block 416) and control returns to block 404 to process the next region.

After all regions have been processed (block 414), the example dataflow optimizer 204 performs dataflow optimizations configured for the execution platform (block 418). The example register allocator 206 assigns registers to the low-level IR (block 420). Then, the post allocation optimizer 208 performs final optimizations configured for the execution platform (block 422). Control then returns to block 310 of FIG. 3.

Figure 5:
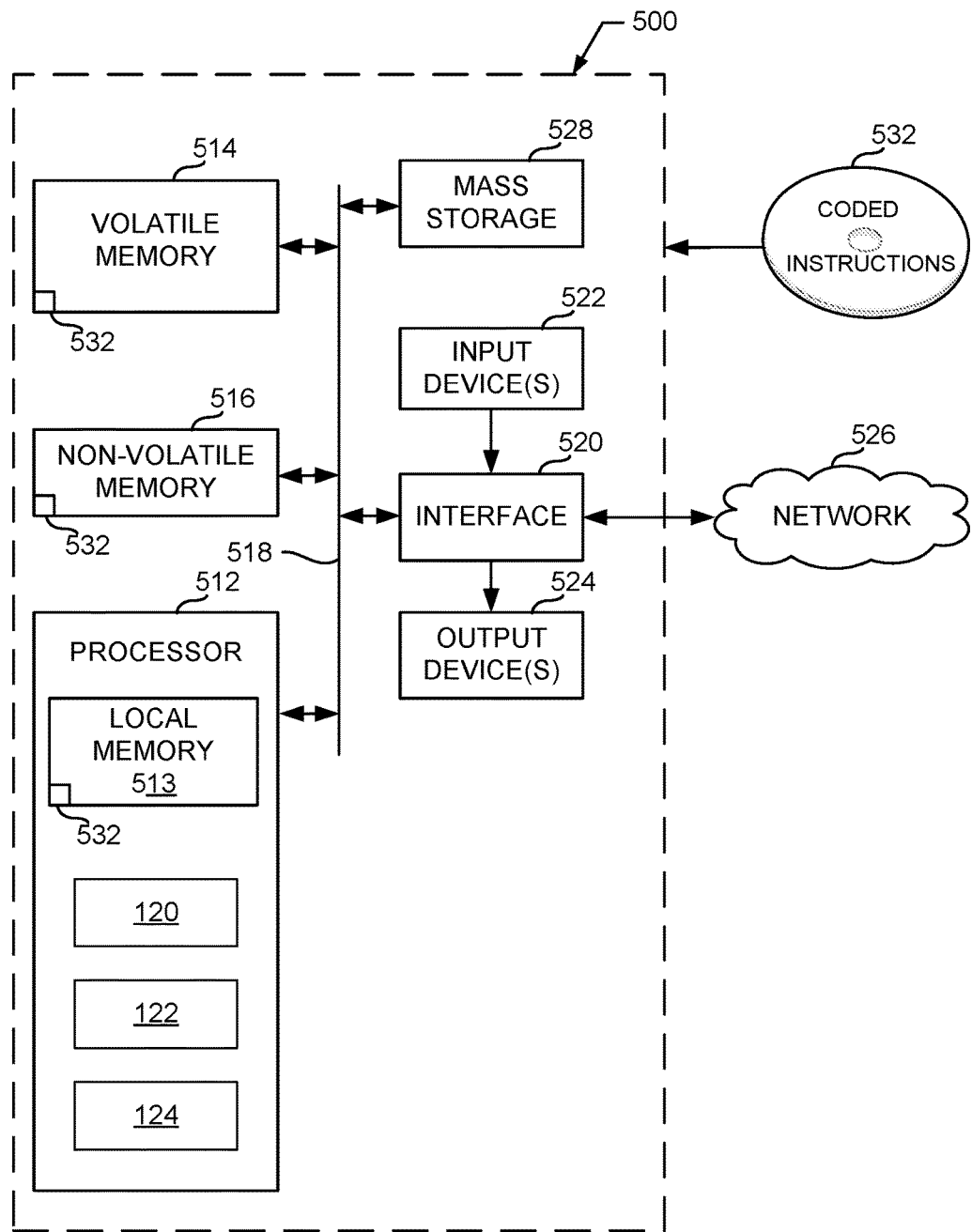
FIG. 5 is a block diagram of an example processing platform structured to execute the instructions of FIGS. 3-4 to implement the compiler of FIG. 1.

FIG. 5 is a block diagram of an example processor platform 500 structured to execute the instructions of FIGS. 3-4 to implement the compiler 104 of FIG. 1 and/or the target machine transformer 124 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example IR transformer 120, the example instruction selector 122, and the example target machine transformer 124, which includes the example dataflow converter 202, the example dataflow optimizer 204, the example register allocator 206, and the example post allocation optimizer 208.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3-4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that generate machine instructions that optimize the execution of software code on an execution platform that supports dataflow execution. In particular, some disclosed examples improve the execution of software code on a spatial accelerator even if the developer of the software code did not develop the code with the spatial accelerator in mind. Integrating the dataflow code generation and optimization into a conventional compiler, for example, allows for leveraging the existing compiler functionality that is not machine dependent while adding machine dependent dataflow functionality. In some examples, the dataflow converter 202 and dataflow optimizer 204 may be a module that may be added to a conventional compiler to facilitate using the same compilation system to target heterogenous computation cores on the same integrated system.

Example 1 includes a compiler apparatus comprising an intermediate representation transformer to transform input software code to intermediate representation code, an instruction selector to insert machine instructions of a target execution platform in the intermediate representation code to generate machine intermediate representation code, and a target machine transformer to convert a portion of the machine intermediate representation code to dataflow code to generate dataflow intermediate representation code, and allocate registers within the dataflow intermediate representation code.

Example 2 includes the compiler apparatus as defined in example 1, wherein the target machine transformer includes a dataflow converter to convert the portion of the machine intermediate representation code to the dataflow code to generate the dataflow intermediate representation code.

Example 3 includes the compiler apparatus as defined in example 2, wherein the dataflow converter is to generate machine specific instructions of the target execution platform for at least one of a join or a split included in the machine intermediate representation code.

Example 4 includes the compiler apparatus as defined in example 2 or example 3, wherein the dataflow converter is to allocate latency insensitive channels to the machine intermediate representation code.

Example 5 includes the compiler apparatus as defined in example 2 or example 3, wherein the dataflow converter is to select a first region of the machine intermediate representation code and to convert the first region to dataflow code prior to converting a second region, wherein the first region is contained within the second region.

Example 6 includes the compiler apparatus as defined in example 2 or example 3, wherein the dataflow converter is to move operations converted to dataflow code onto dataflow units of the target execution platform.

Example 7 includes the compiler apparatus as defined in example 2 or example 3, wherein the dataflow converter is to remove branches from the machine intermediate representation code.

Example 8 includes a compiler apparatus as defined in example 1, example 2, or example 3, wherein the target execution platform is a spatial accelerator.

Example 9 includes a non-transitory computer readable medium comprising instructions that, when executed, cause a machine to at least transform input software code to intermediate representation code, insert machine instructions of a target execution platform in the intermediate representation code to generate machine intermediate representation code, convert a portion of the machine intermediate representation code to dataflow code to generate dataflow intermediate representation code, and allocate registers within the dataflow intermediate representation code.

Example 10 includes the non-transitory computer readable medium as defined in example 9, wherein the instructions, when executed, cause the machine to convert the portion of the machine intermediate representation code to the dataflow code to generate the dataflow intermediate representation code.

Example 11 includes the non-transitory computer readable medium as defined in example 10, wherein the instructions, when executed, cause the machine to generate machine specific instructions of the target execution platform for at least one of a join or a split included in the machine intermediate representation code.

Example 12 includes the non-transitory computer readable medium as defined in example 10 or example 11, wherein the instructions, when executed, cause the machine to allocate latency insensitive channels to the machine intermediate representation code.

Example 13 includes the non-transitory computer readable medium as defined in example 10 or example 11, wherein the instructions, when executed, cause the machine to select a first region of the machine intermediate representation code and to convert the first region to dataflow code prior to converting a second region, wherein the first region is contained within the second region.

Example 14 includes the non-transitory computer readable medium as defined in example 10 or example 11, wherein the instructions, when executed, cause the machine to move operations converted to dataflow code onto dataflow units of the target execution platform.

Example 15 includes the non-transitory computer readable medium as defined in example 10 or example 11, wherein the instructions, when executed, cause the machine to remove branches from the machine intermediate representation code.

Example 16 includes the non-transitory computer readable medium as defined in example 9, example 10, or example 11, wherein the target execution platform is a spatial accelerator.

Example 17 includes a method comprising transforming, by executing an instruction with a processor, input software code to intermediate representation code, inserting, by executing an instruction with a processor, machine instructions of a target execution platform in the intermediate representation code to generate machine intermediate representation code, converting, by executing an instruction with a processor, a portion of the machine intermediate representation code to dataflow code to generate dataflow intermediate representation code, and allocating, by executing an instruction with a processor, registers within the dataflow intermediate representation code.

Example 18 includes the method as defined in example 17, further including converting the portion of the machine intermediate representation code to the dataflow code to generate the dataflow intermediate representation code.

Example 19 includes the method as defined in example 18, further including generating machine specific instructions of the target execution platform for at least one of a join or a split included in the machine intermediate representation code.

Example 20 includes the method as defined in example 18 or example 19, further including allocating latency insensitive channels to the machine intermediate representation code.

Example 21 includes the method as defined in example 18 or example 19, further including selecting a first region of the machine intermediate representation code and to convert the first region to dataflow code prior to converting a second region, wherein the first region is contained within the second region.

Example 22 includes the method as defined in example 18 or example 19, further including moving operations converted to dataflow code onto dataflow units of the target execution platform.

Example 23 includes the method as defined in example 18 or example 19, further including removing branches from the machine intermediate representation code.

Example 24 includes the method as defined in example 17, example 18, or example 19, wherein the target execution platform is a spatial accelerator.

Example 25 includes an apparatus comprising means for transforming input software code to intermediate representation code, means for inserting machine instructions of a target execution platform in the intermediate representation code to generate machine intermediate representation code, means for converting a portion of the machine intermediate representation code to dataflow code to generate dataflow intermediate representation code, and means for allocating registers within the dataflow intermediate representation code.

Example 26 includes the apparatus as defined in example 25, further including means for converting the portion of the machine intermediate representation code to the dataflow code to generate the dataflow intermediate representation code.

Example 27 includes the apparatus as defined in example 26, further including means for generating machine specific instructions of the target execution platform for at least one of a join or a split included in the machine intermediate representation code.

Example 28 includes the apparatus as defined in example 26 or example 27, further including means for allocating latency insensitive channels to the machine intermediate representation code.

Example 29 includes the apparatus as defined in example 26 or example 27, further including means for selecting a first region of the machine intermediate representation code and to convert the first region to dataflow code prior to converting a second region, wherein the first region is contained within the second region.

Example 30 includes the apparatus as defined in example 26 or example 27, further including means for moving operations converted to dataflow code onto dataflow units of the target execution platform.

Example 31 includes the apparatus as defined in example 26 or example 27, further including means for removing branches from the machine intermediate representation code.

Example 32 includes the apparatus as defined in example 25, example 26, or example 27, wherein the target execution platform is a spatial accelerator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A compiler apparatus comprising:
   a memory;
   a processor circuitry;
   an intermediate representation transformer to transform input software code to intermediate representation code;
   an instruction selector to insert machine instructions of a target execution platform in the intermediate representation code to generate machine intermediate representation code; and
   a dataflow converter to convert a portion of the machine intermediate representation code to dataflow code to generate dataflow intermediate representation code including:
      selecting a first region of the machine intermediate representation code;
      converting the first region to the dataflow code prior to converting a second region, wherein the first region is contained within the second region;
      performing a live range analysis to identify a live range when variables in the machine intermediate representation code are active, and
      assigning a latency insensitive channel to the live range; and,
   a target machine transformer to allocate registers within the dataflow intermediate representation code, wherein at least one of the intermediate representation transformer, the instruction selector, the dataflow converter, or the target machine transformer is implemented by the processor circuitry.

2. The compiler apparatus as defined in claim 1, wherein the dataflow converter is to generate machine specific instructions of the target execution platform for at least one of a join or a split included in the machine intermediate representation code.

3. The compiler apparatus as defined in claim 1, wherein the dataflow converter is to move operations converted to dataflow code onto dataflow units of the target execution platform.

4. The compiler apparatus as defined in claim 1, wherein the dataflow converter is to remove branches from the machine intermediate representation code.

5. The compiler apparatus as defined in claim 1, wherein the target execution platform is a spatial accelerator.

6. A non-transitory computer readable medium comprising instructions that, when executed, cause a machine to at least:
   transform input software code to intermediate representation code;
   insert machine instructions of a target execution platform in the intermediate representation code to generate machine intermediate representation code;
   convert a portion of the machine intermediate representation code to dataflow code to generate dataflow intermediate representation code including:
      selecting a first region of the machine intermediate representation code;
      converting the first region to the dataflow code prior to converting a second region, wherein the first region is contained within the second region;
      performing a live range analysis to identify a live range when variables in the machine intermediate representation code are active, and assigning a latency insensitive channel to the live range; and
   allocate registers within the dataflow intermediate representation code.

7. The non-transitory computer readable medium as defined in claim 6, wherein the instructions, when executed, cause the machine to generate machine specific instructions of the target execution platform for at least one of a join or a split included in the machine intermediate representation code.

8. The non-transitory computer readable medium as defined in claim 6, wherein the instructions, when executed, cause the machine to move operations converted to dataflow code onto dataflow units of the target execution platform.

9. The non-transitory computer readable medium as defined in claim 6, wherein the instructions, when executed, cause the machine to remove branches from the machine intermediate representation code.

10. The non-transitory computer readable medium as defined in claim 6, wherein the target execution platform is a spatial accelerator.

11. A method comprising:
   transforming, by executing an instruction with a processor, input software code to intermediate representation code;
   inserting, by executing an instruction with a processor, machine instructions of a target execution platform in the intermediate representation code to generate machine intermediate representation code;
   converting, by executing an instruction with a processor, a portion of the machine intermediate representation code to dataflow code to generate dataflow intermediate representation code including:
      selecting a first region of the machine intermediate representation code;
      converting the first region to the dataflow code prior to converting a second region, wherein the first region is contained within the second region;
   performing a live range analysis to identify a live range when variables in the machine intermediate representation code are active, and
      assigning a latency insensitive channel to the live range; and
   allocating, by executing an instruction with a processor, registers within the dataflow intermediate representation code.

12. The method as defined in claim 11, further including generating machine specific instructions of the target execution platform for at least one of a join or a split included in the machine intermediate representation code.

13. The method as defined in claim 11, further including moving operations converted to dataflow code onto dataflow units of the target execution platform.

14. The method as defined in claim 11, further including removing branches from the machine intermediate representation code.

15. The method as defined in claim 11, wherein the target execution platform is a spatial accelerator.

* * * * *